United States Patent [19]

Fowler

[11] 4,012,728

[45] Mar. 15, 1977

[54] BACK UP ALARM SYSTEM

[75] Inventor: Eugene W. Fowler, Venice, Calif.

[73] Assignee: The Raymond Lee Organization, Inc., New York, N.Y. ; a part interest

[22] Filed: Mar. 31, 1975

[21] Appl. No.: 563,631

[52] U.S. Cl. .................................. 340/224; 340/63; 325/64; 307/10 AT

[51] Int. Cl.$^2$ .......................................... B60R 25/10

[58] Field of Search ............ 340/63, 224, 409, 416; 307/10 AT; 325/64

[56] References Cited

UNITED STATES PATENTS

| | | | |
|---|---|---|---|
| 3,204,222 | 8/1965 | Montroy et al. | 340/224 X |
| 3,688,256 | 8/1972 | D'Ausilio et al. | 340/63 |
| 3,703,714 | 11/1972 | Andrews | 340/63 X |
| 3,893,069 | 7/1975 | Mason | 340/63 |

*Primary Examiner*—Alvin H. Waring
*Attorney, Agent, or Firm*—Daniel Jay Tick

[57] ABSTRACT

Electrically conductive leads electrically connect a relay, a source of electrical energy and a radio transmitter for transmitting radio signals in a back up circuit. The relay is electrically connected to the electric circuit of a burglar alarm system. When an electrical conductor of the burglar alarm system is cut, the relay closes the back up circuit to actuate the transmitter to transmit radio signals indicating that an electrical conductor of the burglar alarm circuit has been cut.

3 Claims, 4 Drawing Figures

BACK UP ALARM SYSTEM

DESCRIPTION OF THE INVENTION:

The present invention relates to a back up alarm system. More particularly, the invention relates to a back up alarm system for a burglar alarm system utilizing an electric circuit.

Objects of the invention are to provide a back up alarm system for a burglar alarm system, which back up alarm system functions more effectively and more rapidly than a silent burglar alarm system to provide complete protection from burglars, since the back up alarm system functions efficiently, effectively and reliably by wireless transmission to warn of the cutting of an electrical conductor of a burglar alarm system circuit.

In order that the invention may be readily carried into effect, it will now be described with reference to the accompanying drawing, wherein.

In the FIGS., the same components are identified by the same reference numerals.

Figure 2:
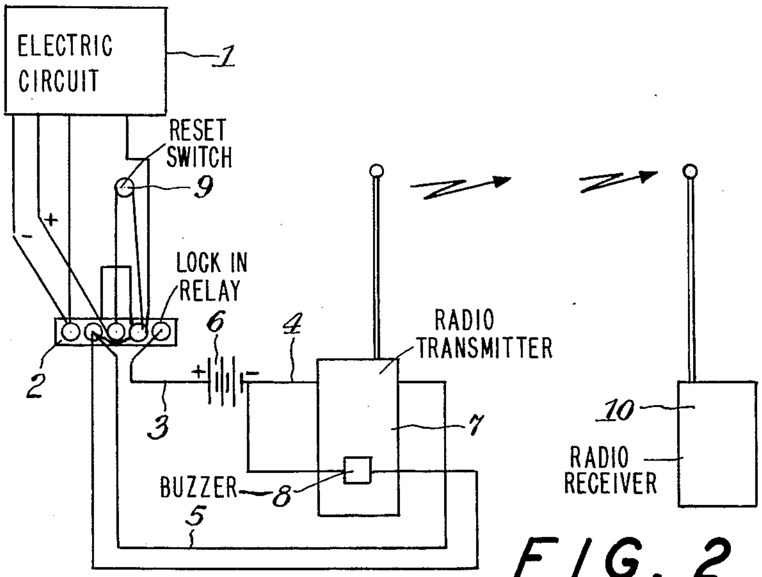
FIG. 2 is a block diagram of a first embodiment of the back up alarm system of the invention.
Figure 1:
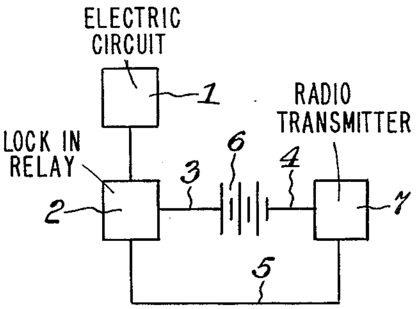
FIG. 1 is a block diagram illustrating the basic back up alarm system of the invention.

The back up alarm system of the invention is for a burglar alarm system utilizing an electric circuit 1 having electrical conductors (not shown in the FIGS.).

The back up alarm system of the invention comprises a lock in relay 2 electrically connected to the electric circuit 1 of the burglar alarm system. The relay 2 may comprise any suitable relay having an energizing winding and relay contacts controlled in position by such energizing winding. The energizing winding of the relay 2 is energized by the circuit 1 of the burglar alarm and maintains the relay contacts normally open so that as long as the burglar alarm circuit is closed and the burglar alarm system is in operative condition, the relay contacts are open. As soon as a conductor of the burglar alarm circuit 1 is cut by a burglar or due to any other circumstance, so that the burglar alarm system becomes inoperative, the relay energizing winding of the relay 2 closes the relay contacts thereof.

The back up alarm system further comprises electrically conductive leads 3, 4 and 5 electrically connecting the lock in relay 2, a source of electrical energy 6 of any suitable type such as, for example, a battery, and a radio transmitter 7 of any suitable type for transmitting radio signals, in a back up circuit with the burglar alarm circuit 1. Thus, when an electrical conductor of the burglar alarm circuit 1 is cut, the relay energizing winding of the lock in relay 2 becomes deenergized and permits the relay contacts thereof to close thereby closing the back up circuit to actuate the transmitter 7. When the transmitter 7 is actuated, it transmits radio signals indicating that an electrical conductor of the burglar alarm circuit 1 has been cut. It also activates an audible alarm such as, for example, a buzzer 8.

A reset switch 9 is electrically connected to the lock in relay 2 for manually resetting the back up circuit.

A radio receiver 10 of any suitable known type (FIG. 2) receives signals transmitted by the transmitter 7 thereby indicating an alarm condition at such receiver.

Figure 3:
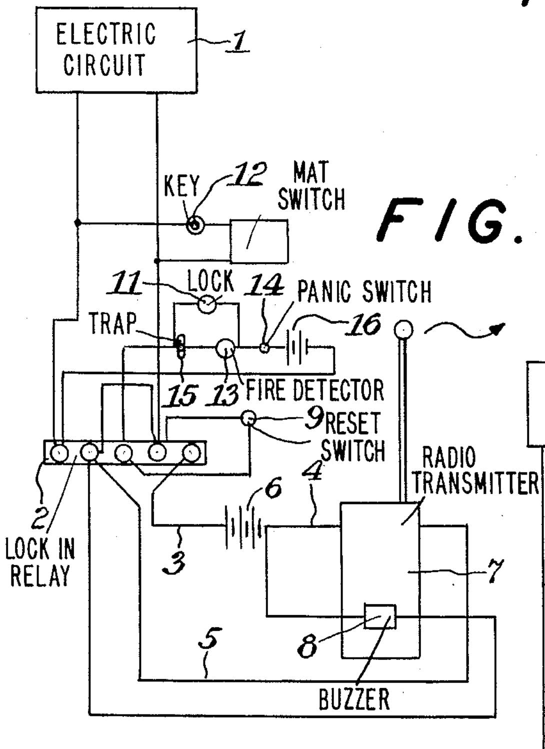
FIG. 3 is a block diagram of a second embodiment of the back up alarm system of the invention.
Figure 4:
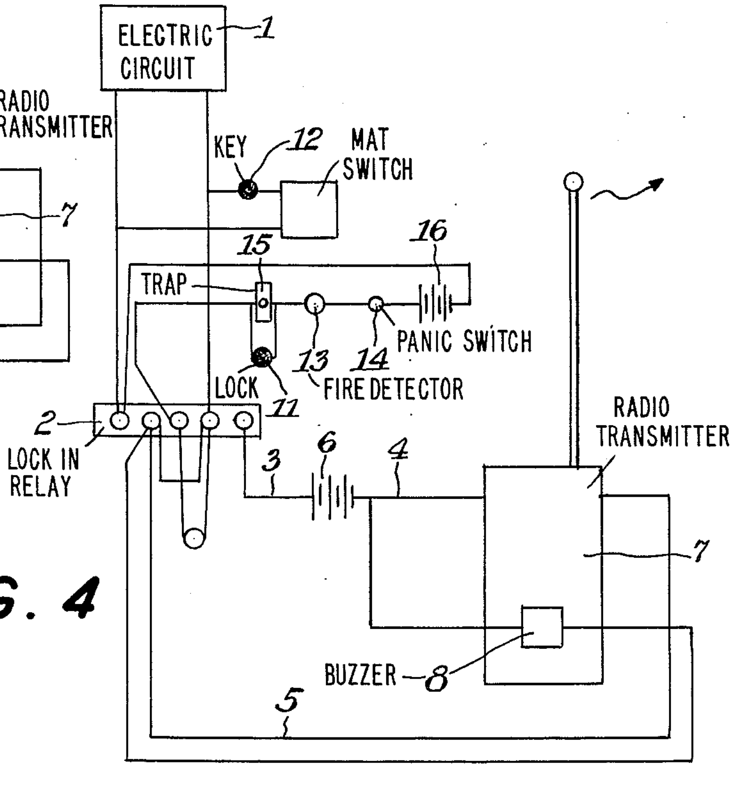
FIG. 4 is a block diagram of a third embodiment of the back up alarm system of the invention.

The embodiment of FIG. 3 includes a lock 11 operated by a key 12, as does the embodiment of FIG. 4. In the embodiment of FIG. 3, a fire detector 13, a panic switch 14, a trap 15 and a battery 16 are connected in circuit with the lock in relay 2 and are unlocked for operation by the key 12 via the lock 11. The embodiment of FIG. 4 is the same as that of FIG. 3, except that the lock controls only the operation of the trap 15 in the embodiment of FIG. 4, whereas it controls the operation of the trap 15 and the fire detector 13 in the embodiment of FIG. 3. A trap is a switch or switches, connected in series and normally closed, used as an alarm switch. The trap may be on a door or a window and may comprise any suitable type of alarm switch.

While the invention has been described by means of specific examples and in specific embodiments, I do not wish to be limited thereto, for obvious modifications will occur to those skilled in the art without departing from the spirit and scope of the invention.

I claim:

1. A back up alarm system for a burglar alarm system utilizing an electric circuit having electrical conductors for operating a burglar alarm under predetermined circumstances, said back up alarm system comprising relay means electrically connected to the electric circuit of a burglar alarm system having electrical conductors;

a source of electrical energy;

a radio transmitter for transmitting radio signals; and electrically conductive leads electrically connecting the relay means, the source of electrical energy and the raido transmitter in a back up circuit with the burglar alarm circuit in a manner whereby the relay means is energized by the electric circuit of the burglar alarm system and maintains the relay means normally open as long as the burglar alarm system is in operative condition and when an electrical conductor of the burglar alarm circuit is cut the relay means is deenergized and closes the back up circuit to actuate the transmitter to transmit radio signals indicating that an electrical conductor of the burglar alarm circuit has been cut, said burglar alarm circuit and said back up circuit constituting different circuits.

2. A back up alarm system as claimed in claim 1, further comprising a reset switch electrically connected to the relay means for manually resetting the back up circuit.

3. A back up alarm system as claimed in claim 1, further comprising a radio receiver for receiving signals transmitted by the transmitter thereby indicating an alarm condition.

* * * * *